United States Patent [19]

Chicken et al.

[11] Patent Number: 4,830,459
[45] Date of Patent: May 16, 1989

[54] OPTICAL FIBRE CABLE

[75] Inventors: Leslie C. Chicken; Ian Houghton, both of Newport, Great Britain

[73] Assignee: STC PLC, London, England

[21] Appl. No.: 154,866

[22] Filed: Feb. 10, 1988

[30] Foreign Application Priority Data

Feb. 12, 1987 [GB] United Kingdom ................. 8703255

[51] Int. Cl.$^4$ .............................................. G02B 6/44
[52] U.S. Cl. ................................................. 350/96.23
[58] Field of Search ..................................... 350/96.23

[56] References Cited

U.S. PATENT DOCUMENTS

| 4,110,001 | 8/1978 | Olszewski et al. | 350/96.23 |
| 4,153,332 | 5/1979 | Longoni | 350/96.23 |
| 4,690,498 | 9/1987 | Priaraggia | 350/96.23 |

FOREIGN PATENT DOCUMENTS

| 0026952 | 4/1981 | European Pat. Off. | 350/96.23 |
| 0158855 | 10/1985 | European Pat. Off. | 350/96.23 |
| 0160778 | 11/1985 | European Pat. Off. | 350/96.23 |
| 2017968 | 10/1979 | United Kingdom | 350/96.23 |
| 2105059 | 3/1983 | United Kingdom | 350/96.23 |
| 2123164 | 1/1984 | United Kingdom . | |
| 2141559 | 12/1984 | United Kingdom | 350/96.23 |

Primary Examiner—John D. Lee
Assistant Examiner—Phan T. Heartney
Attorney, Agent, or Firm—Lee & Smith

[57] ABSTRACT

An aerial optical fibre cable for installation alongside a power distribution system is made with a surface-slotted core acting as strength member and armouring and housing a ribbon optical element. The slot is filled with a soft thixotropic water blocking gel. The slot is closed and sealed with a close-fitting cap which is bound in position with a yarn and the core then driven several times around a capstan with the cap facing outward to induce an excess length of ribbon element in the core when it leaves the capstan. Plastics material is then extruded over the core to provide a tight-fitting sheath.

13 Claims, 4 Drawing Sheets

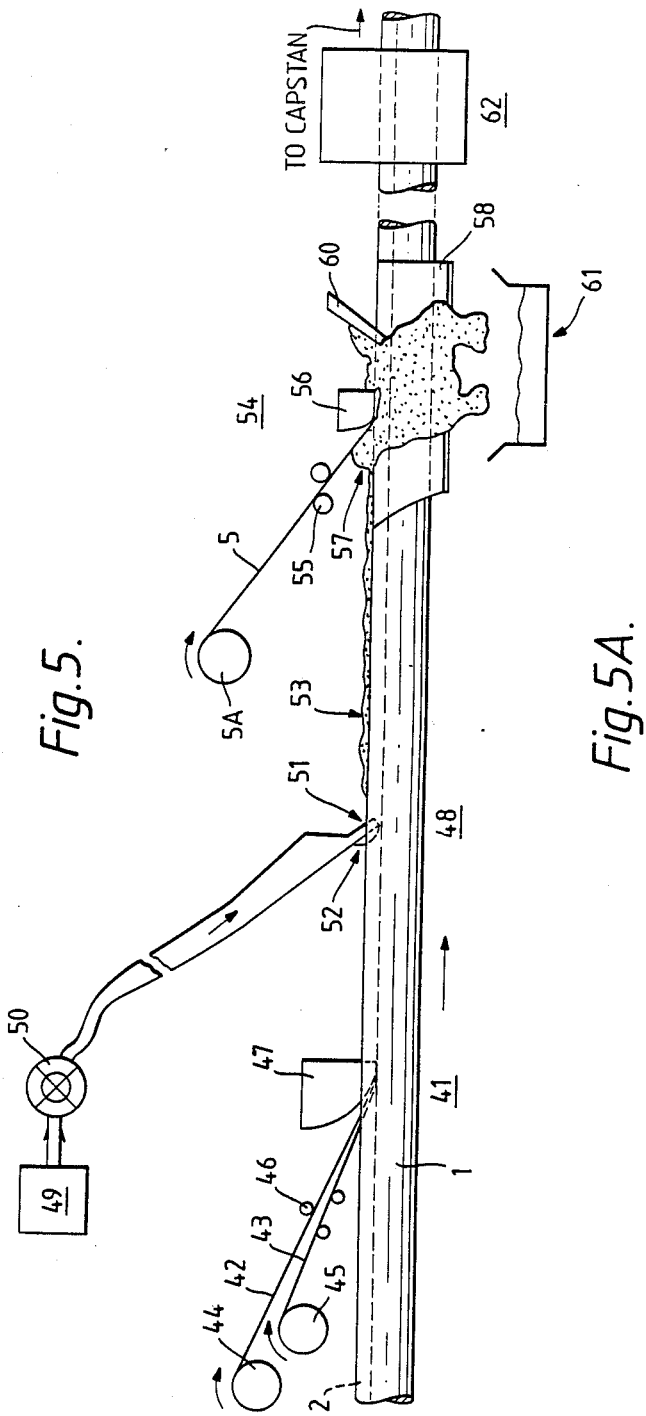

OPTICAL FIBRE CABLE

BACKGROUND OF THE INVENTION

This invention relates to an optical fibre cable, particularly but not exclusively an aerial optical fibre cable which has an all-dielectric or substantially all-dielectric construction, and suitable for installation alongside high voltage power transmission lines.

Prior Art

Various cable designs have been proposed for use as aerial cables incorporating optical fibres, for example as earth wires in an overhead power transmission system. When an overhead power transmission system is installed, it is convenient to use the same route for purely telecommunications purposes. An optical cable earth wire for a power transmission system has already been proposed in British Patent No. 2 029 043 B.

It is also known to utilise optical fibre light guides encased in a synthetic material in an area of a high voltage overhead electrical line, and to utilize a single or multi lead glass fibre cable positioned within a centre area of an overhead electrical conductor or in an outside covering of a phase cable, for transmitting optical communication signals. These are disclosed for example in German OS No. 2314538, OS No. 2604766 and German utility model No. 7328623.

With these proposals, the necessary spatial allocations for the optical and electrical conductors are provided during the installation of the complete system. It is not possible to later install an optical cable on an already existing overhead power line, at least not while the overhead power lines are active.

In order to provide a cable which can be installed in the vicinity of overhead power lines after the overhead power lines have been erected, has been proposed in U.S. Pat. No. 4,342,000. This however is a complex expensive structure to manufacture.

OBJECT OF THE INVENTION

It is an object of the present invention to provide a simple and effective all-dielectric or substantially all-dielectric overhead aerial optical cable which can be installed adjacent a power transmission system which has already been erected.

SUMMARY OF THE INVENTION

According to the present invention in one aspect thereof, there is provided an optical fibre cable comprising an elongate core member defining a surfacial longitudinally-extending slot, one or more optical fibres located in said slot, a closure cap which closes the slot, said slot containing a water blocking medium, and a sheath surrounding the outer surface of the core and the outer surface of said cap, there being an excess length of fibre uniformly distributed throughout the length of the cable.

According to another aspect of the present invention there is provided a method of making a fibre optic cable comprising providing an elongate core member defining at least one longitudinally-extending slot, feeding at least one optical fibre into the slot, feeding a water blocking medium into the slot, closing the slot with a strip like cap, inducing an excess length of fibre in the core member, and applying a sheath over the core and cap.

Preferably the strip like cap is of extruded plastics material and has a segment-shaped cross-section with concavely radiussed end which fit precisely over complimentary convexly radiused upper edges of the slot in the core member. Preferably the strip like cap is held in place by a binder and the core with the strip in place and the grease-like medium filling the slot, is then passed around a giant capstan in order to induce an excess length of fibre into the core when the core is in its natural straight configuration after leaving the capstan.

The outer surface of the core and strip are wiped clean of all excess grease-like medium and the sheath is then applied over the top.

BRIEF DESCRIPTION OF THE DRAWINGS

In order that the invention can be clearly understood reference will now be made to the accompanying drawings in which.

DESCRIPTION OF THE PREFERRED EMBODIMENTS

Figure 1:
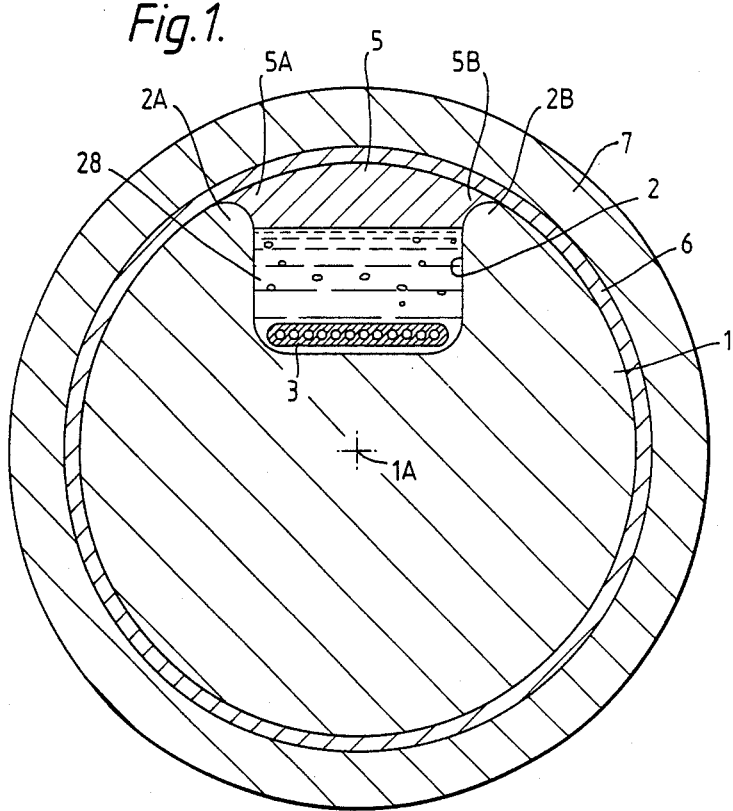
FIG. 1 shows in cross section an aerial optical fibre cable according to an embodiment of the present invention.

Referring to FIG. 1 a non-electrically conductive slotted core 1 of homogeneous material made from glass-fibre reinforced plastics by a pultrusion or similar process, has a rectangular slot 2 with convexly radiussed edges 2A and 2B and containing an optical fibre ribbon element 3 lying at the bottom of the slot 2. The core 1 acts as a cable strength member and armour (being highly crush-resistant) and is resilient with a modulus of at least 40,000 N/mm$^2$.

The slot 2 runs straight along the profile (core) 1 and is referred to later as a surfacial slot. It is always located to one side of the centre of the core, the centre being referenced 1A.

The slot 2 is closed by a cap 5 made of extruded plastics material and having concavely radiussed edges 5A and 5B which exactly fit onto the edges 2A and 2B.

The slot 2 is filled with a grease-like material, for example one sold under the brand name SYNTEC Type FCC 210 and which is a soft thixotropic water blocking material.

Around the core 1 and the cap 5 is a binder 6 which is helically wound around and serves to locate the cap 5 in place on top of the slot 2 prior to extrusion of the outer sheath 7 and during the induction of an excess length of fibre around the large capstan, to be described later.

Figure 2:
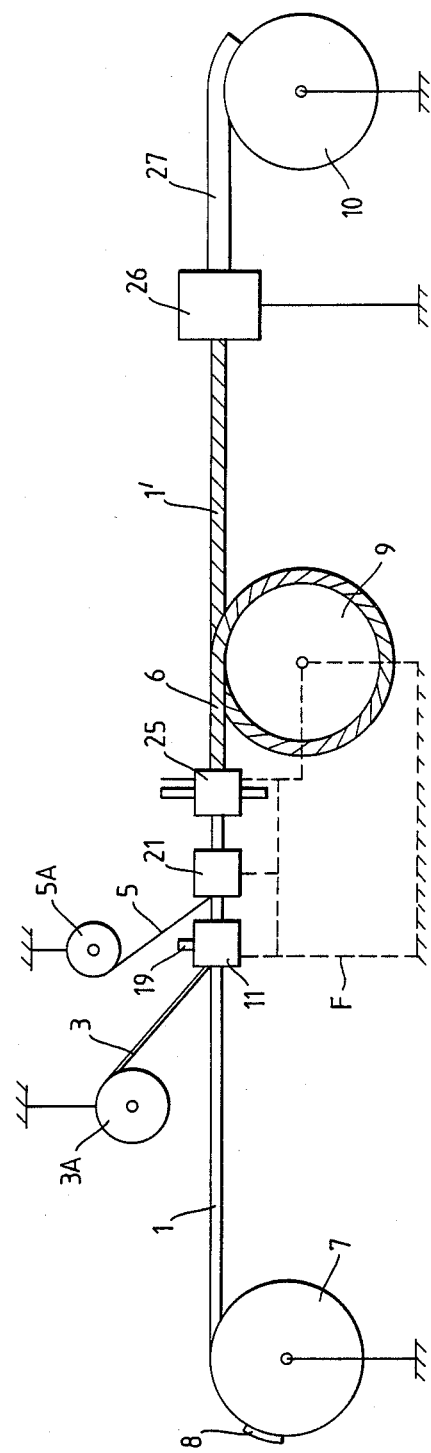
FIG. 2 shows typically apparatus for making the cable of FIG. 1.

In manufacturing the cable it is important that the finished cable has an excess length of fibre in the slot 2. Referring now to FIG. 2, the profile 1 is run from a storage reel 7 having a brake 8 which can be applied to brake rotation of the reel 7. The core 1 passes from the reel 7 through various stages over a capstan 9 and onto a storage drum 10.

When the core 1 leaves the reel 7 it first enters a combined fibre insertion unit and water blocking filling station 11. This is shown in greater detail in FIG. 4.

Ribbon fibre element 3 is drawn from reel 3A and enters the slot 2 of the profile.

Figure 4:
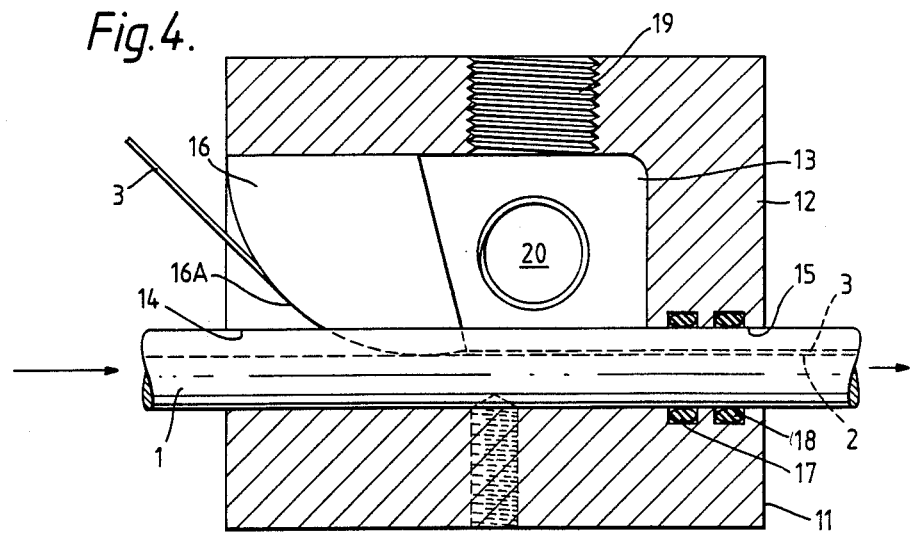
FIG. 4 shows a detail of FIG. 3 and FIGS. 5 and 5A show schematically an alternative manufacturing method and apparatus for a cable similar to that shown in except it has two ribbon fibre elements.

Referring to FIG. 4, the fibre insertion station 11 comprises a casing 12 having a hollow interior 13 through which the profile 1 passes via an entrance port 14 and an exit port 15. There is an orientation plate 16 in the form of a guide shoe having a gently curved surface 16A around which the optical fibre ribbon element 3 is guided into the bottom of the slot 2 as the core 1 is drawn through the casing 12.

At the exit port 15 there are a pair of "O" rings 17 and 18 which clean the excess of filling grease off the surface of the core.

At the top of the casing 12 is an injection port 19 through which a water blocking gel such as "Syntec" is injected into the casing and is applied to the slot 2. Also in the casing is a pressure sensor 20 for sensing the pressure of filling grease or gel in the casing and controlling the rate of application of the grease or gel accordingly.

When the core leaves the casing 12 with the slot 2 filled with thixotropic gel it passes through a second station 21 where the cap 5 is applied.

The cap 5 is fed from a reel 5A and bent over a first guide 22 which comprises a V-grooved pulley wheel, the V-groove having a flat bottom the width of the cap 5, and underneath a second guide 23 which is a curved-groove pulley wheel to exactly match the curved top surface of the cap 5. The second wheel 23 guides the cap 5 towards the slot 2 so that the mating radiussed surfaces 5A, 5B and 2A, 2B mate and fit together.

The core 1 then enters a binding station 25 having a die 24 which has an "O" ring which cleans the whole surface of the core 1 and cap 5 of all filling grease that was applied at station 11. The "O" ring also insures that the cap is tightly fitted into the slot. The rod then passes through a second die beyond which the terylene yarn 6 is applied as a binder around the rod to hold the cap firmly in place. This is indicated schematically as item 25 in FIG. 2 and is shown in greater detail in FIG. 3 where the terylene yarn is fed from an application head 26 which is rotated by a drive mechanism including pulleys 27, 28, 29 and 3 and a motor 31. Speed of the motor is controlled in accordance with the speed of the core 1 through the apparatus.

Figure 3:
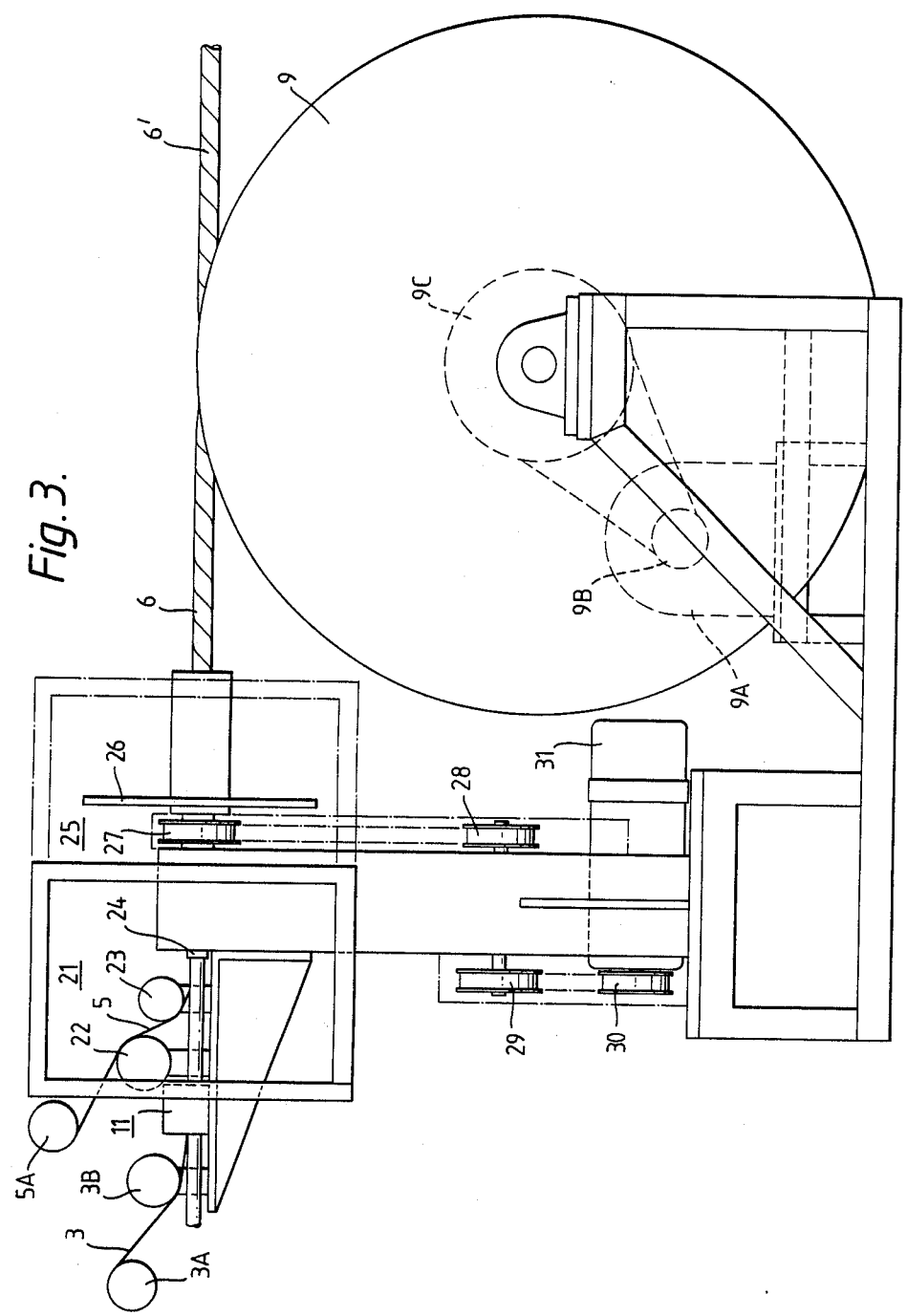
FIG. 3 shows part of the apparatus of FIG. 2.

The terylene binder 6 is indicated on the core in FIGS. 2 and 3.

The core then is applied to the large capstan 9 which is about 1 m in diameter and because the slot containing the ribbon fibre element is on the outside as it passes around the capstan, the core when it leaves the capstan indicated in FIGS. 2 and 3 by the reference numeral 1' has induced in it an excess length of fibre. That is to say an excess length of fibre is drawn back from the fibre supply reel 3A and the thixotropic nature of the filling gel allows movement of the fibre in order for the excess to be induced around the capstan but is sufficiently firm under conditions of no mechanical shear that it holds the excess fibre in a wavy or undulating configuration along the slot when the core leaves the capstan 9.

The core and binder is then sheathed (27) in a plastics extrusion head 26 using preferably low density polyethylene, although other plastics materials can be used according to requirements. The extrusion head is shown on line in FIG. 2 but it could be off line, that is to say a separate extrusion line could be provided.

In FIG. 3 the capstan is the main driving force for pulling the core through the apparatus and as shown in FIG. 3 comprises a drive motor 9A and a pulley system 9B and 9C coupled to drive the capstan 9.

In FIG. 1 the filling medium is preferably a thixotropic material sold under the trade name SYNTEC and is shown in FIG. 1 by the reference numeral 28.

The advantage of using the close-tolerance cap 5 which fits over the slot 2, is that the filling medium 28 can be prevented from exuding into the interface between the strength member core 1 and the plastics extrusion 27. In particular using a suitable filling medium such as SYNTEC, it is found that the excess length of fibre can be easily and effectively induced using the capstan 9 with the filling medium already injected into the slot. We have found that it is important that the capstan is located relatively close to the fibre supply reel 3A. The farther away the capstan is from the supply reel then the more difficult it is to "induce" the excess length of fibre owing to the resistance of the filling medium 28.

It should also be noted in FIG. 4 that the shoe 16 is a close tolerance fit in the slot 2 and thereby not only feeds the fibre into the bottom of the slot but also orientates the slot in the desired upward direction with respect to the rest of the apparatus.

The filling medium is forced into the slot 2 in head 11 at a pressure in the range 0.1 to 0.2 p.s.i. as measured in the head 11. The filling medium is soft enough to enable the excess length of fibre to be induced by the capstan without providing so much resistance to fibre movement within the slot as to induce stretching of the fibre element so that the excess developed would otherwise be removed by stretching of the fibre ribbon element. On the other hand the fibre medium is not so soft that it will run out of the slot and it is firm enough to hold the ribbon element in a generally undulating configuration without the fibre "creeping" along the slot in use of the cable so that some portions have no excess while other portions have double the excess.

We have found that this technique is effective in ensuring that the excess length of fibre becomes uniformly distributed throughout the cable. Attempting to fill the slot after inducing the excess can issue irregular distribution of excess fibre.

It is pointed out here that the manufacturing technique and cable construction described has a number of other advantages. The cap 5 as it is fitted onto the slot 2 increases the degree of filling of water blocking medium over and above previous ways of filling and wrapping. In particular, the action of the cap being, as it were, rolled into the slot in a progressive manner in the core 1 proceeds through the filling station, tends to squeeze out excess water blocking medium and any untrapped air bubbles gets squeezed out too. Furthermore, the cap 5 is made of transparent plastics and so appears transparent when the slot is completely filled, but provides a useful visual check as to the degree of filling obtained.

It is also important that complete filling takes place leaving no air gaps into which moisture could eventually permeate, because under conditions of high electrical stress such as is encountered in the vicinity of high voltage power transmission systems, degradation may occur leading to damage to the strength member core 1, if air gaps and moisture are present.

It is also important to obtain complete filling so that no air or moisture reaches the fibres themselves otherwise degradation of the fibre transmission properties may occur with time.

The water blocking filling technique described can be modified as shown in FIG. 5. Instead of feeding the material into the slot in a purely pressure-controlled manner, it would be possible to meter the material into the slot through a tube in accordance with the speed at which the core is drawn through the filling station and the cross-sectional area of the closed slot, so that a predetermined degree of fill is achieved without at the same time wetting the outside of the core 1 and the cap 5.

Referring to FIG. 5 the slotted rod 1 is fed from left to right and passes through a ribbon fibre element insertion station 41. Here a pair of ribbon fibre elements 42 and 43 are fed from ribbon pay off reels 44 and 45 via guide pulleys such as 46 to a segment-shaped shoe 47 (exactly the same in function as the shoe 16 shown in FIG. 4) which guides the ribbon fibre element into the slot 2 of the rod 1.

Following the fibre insertion station 41 is a water blocking compound filling station 48 where filling compound (such as Syntec Rheogel FCC 210S) is pumped via a supply pump 49 and a metering pump 50 which delivers the filling compound at a constant delivery rate which has been ratioed to the line speed in consideration of the slot cross sectional area. The filling compound is pumped via a nozzle 51 which lies within the slot 2 and has a radius 52 on its leading edge. The filling compound is pumped into the slot and is metered such as to provide a slight excess just above the level of the slot and this is shown by reference numeral 53.

Beyond the filling station 48 is a cap insertion station 54 where the slot cap 5 is fed from a supply reel 5A and travels via guide pulleys 55 until it reaches a segment-shaped guide 56 which is like a shoe and similar to the shoe 47. This segment 56 guides the cap firmly on to the top of the slot 2 to close the slot and as can be seen in the drawing this pushes the excess filling medium in a "rolling" bank 57 and excess filling compound exudes over the side.

A pair of longitudinal wiper blades 58 and 59, shown more clearly in FIG. 5A, prevent this exuding compound running down the side of the slotted rod 1.

In addition there is a horizontal wiper blade 60, also more clearly seen in FIG. 5A which "shovels" the filling compound which is still being carried by the slotted rod and the cap which is now firmly in position, and diverts the excess filling compound being carried by the rod and the cap in a sideways direction on both sides of the rod so that it falls over on to the longitudinal wiper blades 58 and 59.

A collection tray 61 collects the exuding filling compound for recycling or disposal as desired.

In this way the filling compound is prevented from providing a smear all over the total surface of the slotted rod and although in the previous embodiment the O rings 17 and 18 shown in FIG. 4 and finally the O ring 24 in FIG. 3, are in combination intended to wipe the rod clean of any excess filling material, there is nevertheless normally a remaining "smear" of filling compound on the surface of the rod. The embodiment shown in FIG. 5 on the other hand removes substantially all the excess filling material from the outer surface of the rod and the cap so that as the capped rod approaches the helical binder head, shown schematically at 62 the surface of the rod is substantially free of any excess filling compound.

The wiper blades shown in FIGS. 5 and 5A would be of neoprene rubber or moulded rubber or similar and it is important that the longitudinal wiper blades 58 and 59 provide a good edge seal against the rod as it proceeds along the production line. Similarly, the horizontal wiper 60 provides a good cross wise seal on the top of the rod and the combination of the three wipers removes all the excess filling compound.

The helical binder head 62 is substantially the same as that shown in FIG. 3 and the remainder of the production technique is the same as described previously.

As an alternative to the horizontal wiper 60 a V shaped wiper, rather like a "snow plough" could be used in order to more easily divert the excess compound to either side of the rod and on to the longitudinal wipers.

Although the invention has been described in terms of an aerial cable. It is clear that the cable could have application as a cheap land cable, in which case the core member might not need to be so strong and the non-metallic requirement might no longer apply.

We claim:

1. An optical fibre cable comprising an elongate core member defining a surfacial longitudinally-extending slot, one or more optical fibres located in said slot, a longitudinal closure cap which extends along and closes the slot, said slot containing a water blocking medium, and a sheath surrounding the outer surface of the core and the outer surface of said cap, there being an excess length of fibre uniformly distributed throughout the length of the cable.

2. A cable as claimed in claim 1, wherein the cap comprises an extruded plastics strip having a segment-shaped cross section with concavely-radiussed ends which fit precisely over complimentary convexly radiussed upper edges of the slot in the core member.

3. A cable as claimed in claim 1, wherein the cap is bound with a binder lying beneath the sheath.

4. A cable as claimed in claim 1, wherein the slot has a substantially rectangular cross section and said at least one optical fibre is contained in a ribbon like element.

5. An optical fibre cable as claimed in claim 1, said slot, in cross section of the cable, lying wholly to one side of the geometric centre of the member.

6. An optical fibre cable as claimed in claim 1, wherein the core member is non-electrically-conducted.

7. A method of making a fibre optic cable comprising providing an elongate core member defining at least one longitudinally-extending slot, feeding at least one optical fibre into the slot, feeding a water blocking medium into the slot, closing the slot with a strip like cap extending along the slot, inducing an excess length of fibre in the core member, and applying a sheath over the core and cap.

8. A method as claimed in claim 7, comprising driving the core member around a capstan so that when the core member leaves the capstan the excess length of optical fibre has been induced into the core.

9. A method as claimed in claim 8, comprising applying a binder to hold the cap securely to the core member prior to driving the core member around the capstan.

10. A method as claimed in claim 7, comprising wiping the surface of the core and cap clean of any excess water blocking medium, prior to applying said sheath.

11. A method as claimed in claim 7, wherein the core is moved through an injection head containing water blocking material at above ambient pressure to fill the slot with the material.

12. A method as claimed in claim 7, wherein the core is moved through a station in which filling compound is injected via a tube directly into the slot with a slight excess which is removed by wipers.

13. A method of as claimed in claim 7, said core member being made of a resilient non-electrically-conductive material and forming a main strength member of the cable.

* * * * *